United States Statutory Invention Registration [19]

[11] Reg. Number: H941

Wyluda

[43] Published: Aug. 6, 1991

[54] PROJECTILE WITH BEARING SLEEVE AND JOURNAL SLEEVE

[75] Inventor: Paul Wyluda, South River, N.J.

[73] Assignee: The United States of America as represented by the Secretary of the Army, Washington, D.C.

[21] Appl. No.: 649,410

[22] Filed: Feb. 1, 1991

[51] Int. Cl.[5] ..... F42B 14/06

[52] U.S. Cl. ..... 102/522; 102/514; 102/524

*Primary Examiner*—Harold J. Tudor

*Attorney, Agent, or Firm*—Anthony T. Lane; Edward Goldberg; Michael C. Sachs

[57] ABSTRACT

A projecetile for firing in a gun barrel has a jacket and a load. A bearing sleeve is mounted in the jacket and the jacket is of a different material than the bearing sleeve. A journal sleeve is mounted in the bearing sleeve to axially rotate therein. The load is mounted in the journal sleeve to rotate therewith. Thus angular rotation of the load with respect to the gun barrel is reduced.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROJECTILE WITH BEARING SLEEVE AND JOURNAL SLEEVE

GOVERNMENTAL INTEREST

The invention described herein may be manufactured, used, and licensed by or for the Government for Governmental purposes without payment to me of any royalties thereon.

BACKGROUND OF THE INVENTION

The present invention relates to projectiles for firing in a gun barrel, and in particular, to projectiles that have rotating parts to reduce projectile spin.

For most small arms weapon systems, that is, weapon systems of caliber 40 mm or less, the gun barrels are rifled to induce a high angular spin to projectiles exiting the muzzle. Projectiles requiring spin for aerodynamic stability are called spin-stabilized projectiles. For other projectile types that do not require a high angular spin (or types that experience degraded performance when spun, e.g., fin stabilized projectiles) a "slip device" is normally mounted on the projectile body to reduce or eliminate spin induced by the rifling. This rotating device usually consists of a rotating band that is free to rotate or slip around the projectile body, thereby permitting only axial projectile motion and not rotational motion during firing. This technique has been used successfully with large caliber ammunition and in some instances with small caliber ammunition.

A serious drawback with the foregoing technique is that the "slip device," which is usually composed of a polymeric type material, is exposed to the environment and is subject to possible damage. Rough handling by soldiers and exposure to machine oils are just a few possible situations that may damage the "slip device." This situation can lead to poor performance or failure of the ammunition if sufficient damage occur to the "slip device."

Accordingly, there is a need for an arrangement to reduce the spinning of a projectile to avoid performance degradation in a way that is relatively immune to damage from handling.

SUMMARY OF THE INVENTION

In accordance with the illustrative embodiments demonstrating features and advantages of the present invention, there is provided a projectile for firing in a gun barrel. The projectile has a jacket and a bearing sleeve mounted in the jacket. This jacket is of different material than the bearing sleeve. A journal sleeve is mounted in the bearing sleeve to axially rotate therein. A load is mounted in the journal sleeve to rotate therewith. Thus the angular rotation of the load with respect to the gun barrel is reduced.

In a related embodiment of the same invention, the projectile has a bearing sleeve, a journal sleeve and a load. The bearing sleeve has a predetermined axial length. The journal sleeve is of about the same predetermined axial length. Similarly, the load is about the same predetermined axial length.

By employing apparatus of the forgoing type, an improved projectile is achieved. The preferred embodiment is able to reduce the angular rotation of the internal load of a projectile despite the rifling of the gun barrel. The preferred projectile may be of a small caliber although the technique may be applied to larger calibers.

In a preferred embodiment, a projectile jacket uses a known structure that breaks apart on exiting the muzzle to permit release of an internal package. The preferred package includes a journal sleeve nested inside a bearing sleeve. Preferably both sleeves would be formed of a polymeric material having microencapsulated lubricants. In some embodiments, the bearing sleeve can be molded to the inside of the jacket.

To lock the bearing sleeve in place, the bottom of the jacket can have one or more axially asymmetric concavities that prevent the bearing from slipping inside the jacket. In some preferred embodiments, either the bearing sleeve or the journal sleeve can have inter-sleeve projections that reduce the amount of surface contact between the sleeves. These projections reduce friction and allow the sleeves to rotate with respect to each other.

Preferably, the two sleeves may be partially segmented to allow them to fold back petal-wise after firing. This arrangement can allow the load within the sleeves to be launched separately from the jacket. In some embodiments, the load may be a plurality of subloads such as flechettes, surrounded by buffering particles to keep the flechettes aligned during handling and firing.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention, when taken in conjunction with the accompanying drawings wherein.

DETAILED DESCRIPTION OF THE PREFERRED EMBODIMENTS

Figure 1:
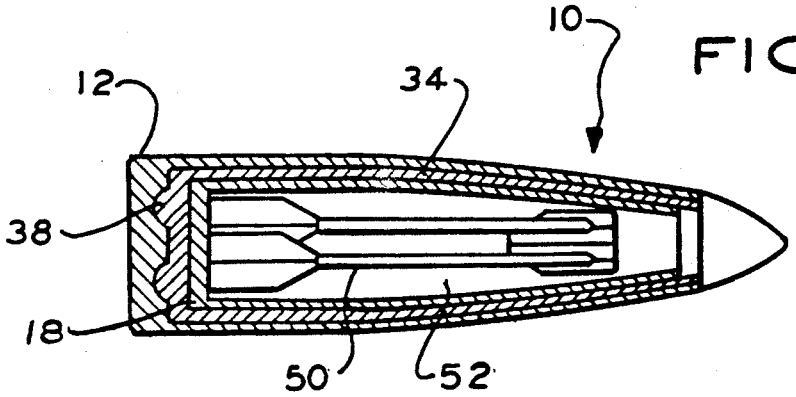
FIG. 1 is an axial sectional view of the projectile according to the principles of the present invention.

Referring to FIG. 1, a projectile 10 is shown with a jacket 12. The front of jacket 12 is designed to open or break apart to release its internal package upon existing the muzzle. This jacket is designed to handle the dynamic forces occurring during setback and firing and therefore can protect the internal package. In this embodiment, the internal package comprises a journal sleeve 18 nested within a bearing sleeve 34. Sleeve 34 has a pair of rear projections 38 that fit into corresponding concavities in the bottom of jacket 12. These projections 38 are not axisymmetric, but are a pair of diametric, hemispherical bosses. As such, projections 38 lock sleeve 34 in jacket 12 to prevent relative rotation between them. While the projections 38 tend to lock the bearing sleeve 34 in the jacket 12, in some designs a certain amount of slip between jacket 12 and sleeve 34 will be tolerated or desirable.

Sleeves 18 and 34 are made of a polymeric material, preferably having a microencapsulated lubricant. Thus, sleeves 18 and 34 have the ability to relatively rotate. In the instance where projectile 10 is a caliber 0.50 mm projectile, the sidewalls of bearing sleeve 34 and journal sleeve 18 will be approximately 0.010 inch thick, while the base will be approximately 0.020 inch thick; although these dimensions may vary in other embodiments In this embodiment, the load 50 within sleeve 18 are anti-personnel/anti-material projectiles such as flechettes packed in buffering particles 52. The buffering particles may be material suitable for keeping the flechettes aligned as illustrated and acting as a shock absorber during handling and during firing. This design is more efficient since the package can be dispersed in the primary direction of a target; unlike an explosive munition in which the submunition are scattered and only a small percent are in a direct line with the target.

While a plurality of flechettes are illustrated, the load could be instead a single projectile that does not require a high spin rate for aerodynamic stabilization. A mass stabilized projectile may be used.

Figure 3:
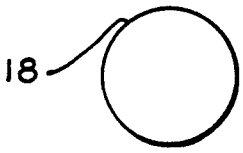
FIG. 3 is a back end view of the sleeve of FIG. 2.
Figure 2:
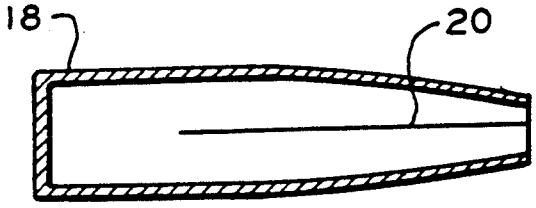
FIG. 2 is an axial sectional view of a journal sleeve in the projectile of FIG. 1.

Referring to FIGS. 2 and 3, a generally, axially symmetric journal sleeve 18 is shown with a closed base and open front. The sleeve can be formed from a polymeric material and preferably include microencapsulated lubricant. Sleeve 18 is shown partially segmented by a plurality of slits 20 that may be 3 or 4 in number, although in alternate number of slits may be employed. In some embodiments, slits 20 need not go completely through the sleeve, but may be a narrowed rupture line that can tear apart after firing. The journal slits 20 allow the front of sleeve 18 to fold back into a plurality of petal segments.

Figure 5:
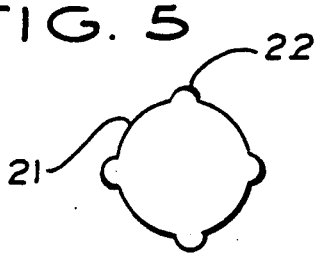
FIG. 5 is a back end view of the sleeve of FIG. 4.
Figure 4:
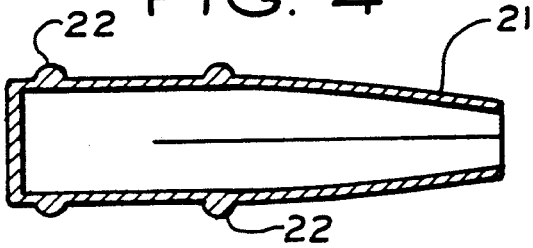
FIG. 4 is an axial sectional view of a journal sleeve that is an alternate to that of FIG. 2.

FIGS. 4 and 5 show a journal sleeve 21 similar to the foregoing sleeve, but modified to have eight journal bosses 22. The bosses are shown as external hemispherical projections, integrally molded with the material of sleeve 21. In this embodiment, the eight bosses are laid down in two circular patterns of four bosses each. Each circular pattern has bosses spaced equiangularly about the axis of the sleeve 21.

Figure 8:
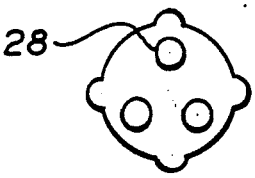
FIG. 8 is a back end view of the sleeve of FIG. 6, but modified to show a different projection pattern.
Figure 7:
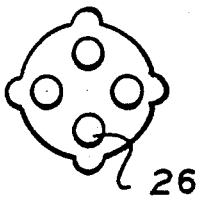
FIG. 7 is a back end view of the sleeve of FIG. 6.
Figure 6:
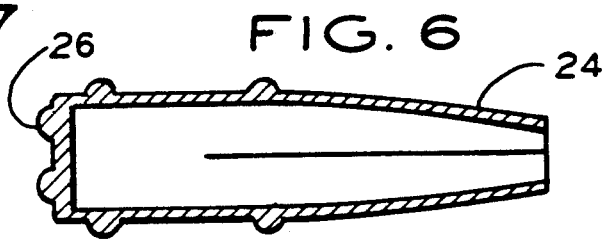
FIG. 6 is an axial sectional view of a sleeve that is an alternate to that of FIG. 2.

Referring to FIGS. 6 and 7, the sleeve previously illustrated in FIG. 4 is modified and illustrated herein as sleeve 24 having additional pattern of four rear projections 26. In FIG. 8 an alternate pattern of 3 projections 28 are illustrated.

Figure 9:
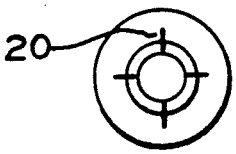
FIG. 9 is a front end view of the sleeve of FIG. 2.
Figure 10:
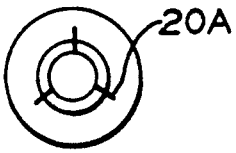
FIG. 10 is a front end view of the sleeve of FIG. 2, but modified to have a different slit pattern.

Referring to FIGS. 9 and 10, a front view of the sleeve of FIG. 2 shows previously mentioned slits 20 arranged symmetrically at 90° intervals. In Figure 10, a front view of the sleeve of FIG. 2 is modified to show three slits 20A arranged symmetrically at 120° intervals.

Figure 11:
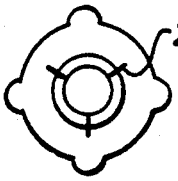
FIG. 11 is a front end view of the sleeves of FIGS. 4 and 6.
Figure 12:
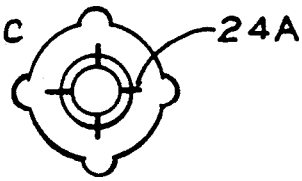
FIG. 12 is a front end view of the sleeves of FIGS. 4 and 6, but modified to have a different slit pattern.

Referring to FIG. 11, the front view of the sleeves of FIGS. 4 and 6 is shown with a pattern of three slits 24c disposed symmetrically at 120° intervals. In FIG. 12, slits 24A are shown in a modified arrangement spaced symmetrically at 90° intervals.

Figure 14:
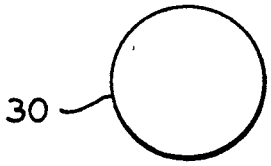
FIG. 14 is a back end view of the sleeve of FIG. 13.
Figure 13:
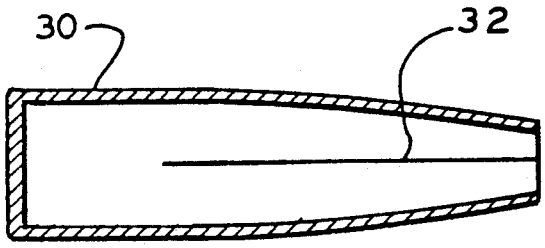
FIG. 13 is an axial sectional view of a bearing sleeve in the projectile of FIG. 1.

Referring to FIGS. 13 and 14, bearing sleeve 30 is shown as a generally axisymmetric sleeve with a closed base and an open front. Sleeve 30 is formed of a polymeric material with microencapsulated lubricants, similar to the previously described journal sleeve of FIG. 2. Also, sleeve 30 is shown with a plurality of bearing slits 32, which may pass through the entire thickness of sleeve 30 or in some embodiments be a narrowed rupture line designed to allow the front of sleeve 30 to fold backward into petal segments.

Figure 16:
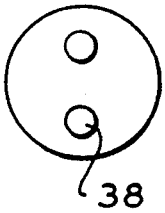
FIG. 16 is a back end view of the sleeve of FIG. 15.
Figure 17:
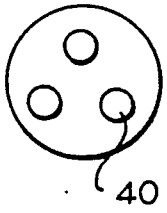
FIG. 17 is a back end view of the sleeve of FIG. 15, but modified to show a different projection pattern.
Figure 15:
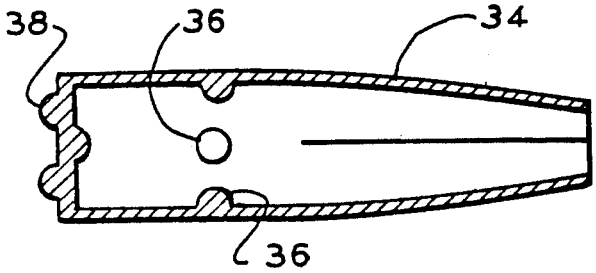
FIG. 15 is an axial sectional view of a sleeve that is an alternate to that of FIG. 13.

Referring to FIGS. 15 and 16, the previously illustrated sleeve of FIG. 13 is shown modified as a sleeve 34 having a plurality of integrally molded, internal bearing bosses 36. In this embodiment four hemispherical bosses 36 are distributed equiangularly at 90° intervals. In some embodiments bosses 36 can be arranged as an annular internal ridge to provide support around a 360° locus. The rear of sleeve 34 is shown having a pair of hemispherical projections 38 for locking the position of sleeve 34. In FIG. 17, the projection pattern of FIG. 16 is modified to show three hemispherical projections 40.

Figure 20:
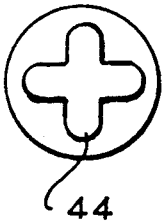
FIG. 20 is a back end view of the sleeve of FIG. 18, but modified with a different projection pattern.
Figure 19:
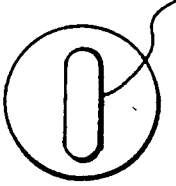
FIG. 19 is a back end view of the sleeve of FIG. 18.
Figure 18:
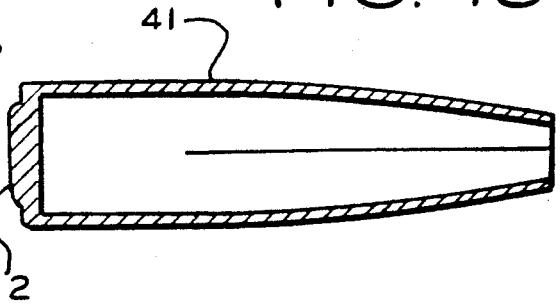
FIG. 18 is an axial sectional view of a sleeve that is an alternate to that of FIG. 13.

Referring to FIGS. 18 and 19, the sleeve previously illustrated in FIG. 13 is shown modified as a sleeve 41 having at its base an elongate projection 42, again for the purpose of locking the sleeve into position. In FIG. 20, the previously mentioned projection is modified into cruciform projection 44.

Figure 22:
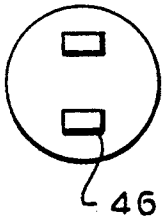
FIG. 22 is a back end view of the sleeve of FIG. 21.
Figure 21:
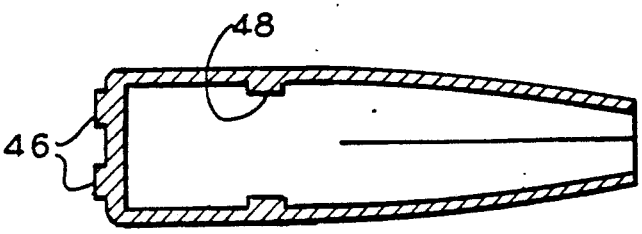
FIG. 21 is an axial sectional view of a sleeve that is an alternate to that of FIG. 13.

Referring to FIGS. 21 and 22, the previously illustrated sleeve of FIG. 13 is shown modified to have a pair of rectangular projection 46. Also, internal bosses 48 are shown in a modified form.

Figure 25:
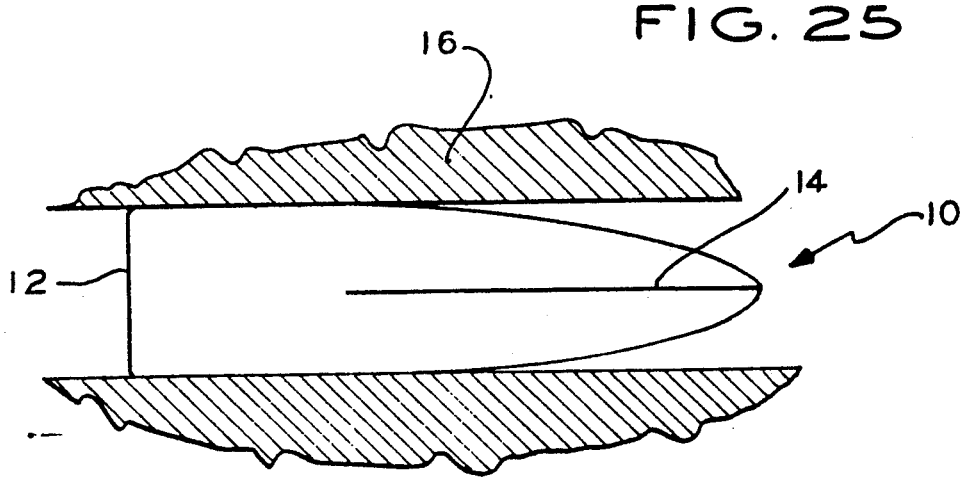
FIG. 25 is a side view of the projectile of FIG. 1 mounted in a gun barrel shown partially and in section.
Figure 23:
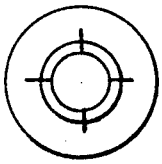
FIG. 23 is a front end view of the sleeves of FIGS. 13–22.
Figure 24:
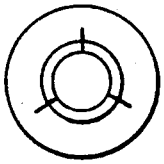
FIG. 24 is a front end view of the sleeves of FIGS. 13–22, but modified to have a different slit pattern.

Referring to FIG. 25, projectile 10 is shown being fired through a gun barrel 16. Projectile 10 is shown having a jacket 12 that is designed to open or break apart along lines 14 to permit release of its contents upon exit from the muzzle. Jacket 10 is of a known design capable of withstanding the dynamic loads of setback and firing. Its structural rigidity is sufficient to keep its contents intact. As explained hereinafter, the slits 14 upon exiting the muzzle will allow the front segments of jacket 12 to fold back petal-wise to release its contents.

To facilitate an understanding of the principles associated with the foregoing, the operation of the apparatus of FIG. 1 and 25 will be described in connection with FIG. 26. Projectile 10 is loaded into gun barrel 16 and fired in the usual fashion. Before firing the fit between the sleeves is snug but not tight. When fired through barrel 16, its rifling tends to spin jacket 12. Because projections 38 lock sleeve 34 to jacket 12, sleeve 34 spins as well. Advantageously, the spinning of sleeve 34 tends to drive its side walls outwardly to reduce the force between it and sleeve 18. Also, the centrifugal force tends to cause separation of the petal segments of sleeve 34 when leaving the muzzle.

Since sleeve 18 and its load 50 have a certain amount of mass, load 50 does not tend to rotate with the sleeve 34. Instead, relative rotation occurs between sleeves 18 and 34. In instances where a bosses project between sleeves 18 and 34, the sleeves ride on the bosses and friction is correspondingly reduced.

Figure 26:
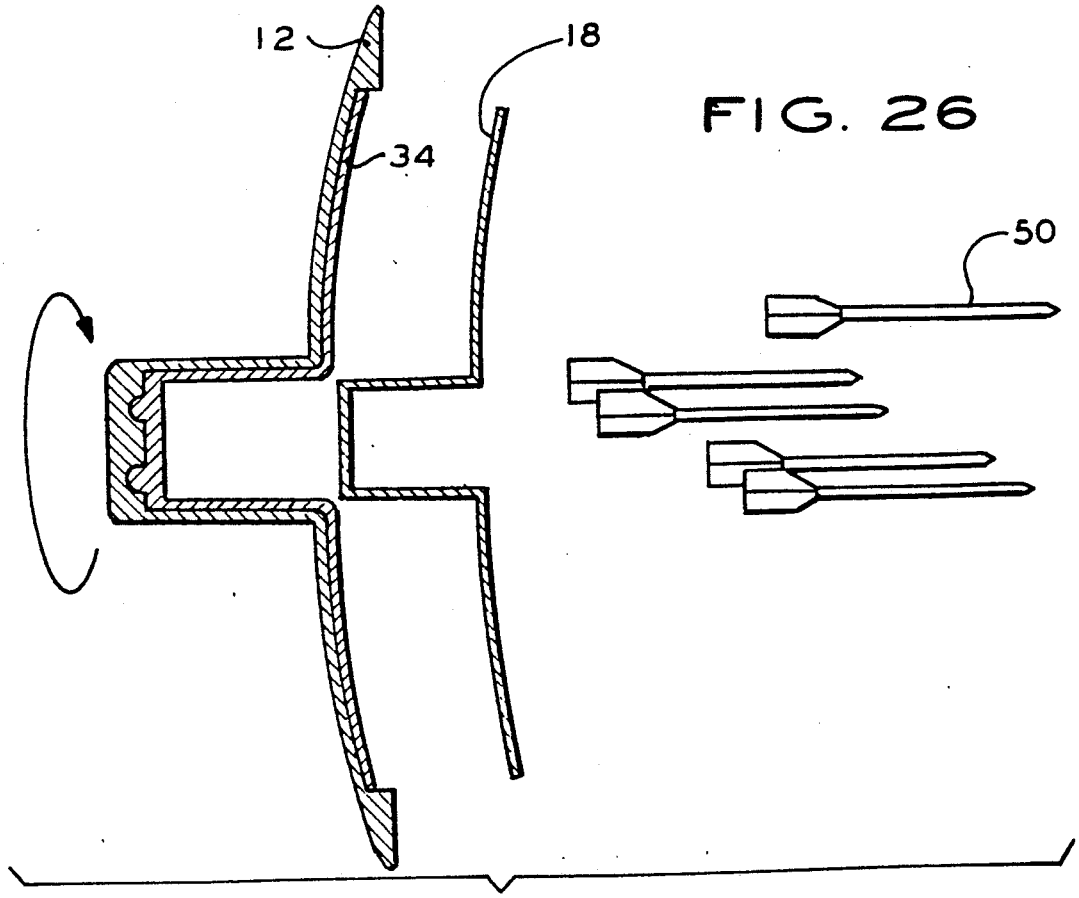
FIG. 26 is a view showing the projectile of FIG. 23 at the moment of launch and separation.

Upon leaving the muzzle, jacket 12 and bearing sleeve 34 will fold backwardly into the petal segment shown in FIG. 26. The journal sleeve 18 will fold in a similar fashion. At this time, load 50 is launched in the general direction of the target. Throughout the firing sequence, the buffering particles act as shock absorbers to maintain the relative position of the flechettes 50. After firing, the buffering particles are scattered and do not travel a significant distance.

It is to be appreciated that various modifications may be implemented with respect to the above described preferred embodiment. For example, the caliber of the various components can be changed depending upon the load being fired. Furthermore, the load can be any type of load that may be fired by a gun. Furthermore, the materials of the sleeves can be other then polymeric and may be of any type of plastic, metal or other material suitable for firing. Also, the shape of the various projections can be altered depending upon the type of projectile, the expected forces etc.

Obviously many modifications and variations of the present invention are possible in light of the above teachings. It is therefore to be understood that within the scope of the appended claims, the invention may be practiced otherwise than as specifically described.

I claim:

1. A projectile for firing in a gun barrel, comprising:

a jacket;

a bearing sleeve mounted in said jacket, said jacket being of a different material than said bearing sleeve;

a journal sleeve mounted in said bearing sleeve to axially rotate therein;

a load mounted in said journal sleeve to rotate therewith whereby the angular rotation of said load with respect to said gun barrel is reduced.

2. A projectile according to claim 1 wherein said bearing sleeve is fixed within said jacket.

3. A projectile according to claim 1 wherein said bearing sleeve is molded within said jacket.

4. A projectile according to claim 1 wherein said bearing sleeve has an axially asymmetric outer surface for fixing said bearing sleeve within said jacket.

5. A projectile according to claim 4 wherein said jacket has an inner surface mating with the outer surface of said bearing sleeve.

6. A projectile according to claim 1 wherein said bearing sleeve is frangible.

7. A projectile according to claim 1 wherein said bearing sleeve has a forward end with a plurality of longitudinal bearing slits extending part of the length of said bearing sleeve to divide said bearing sleeve into a plurality of petal segments that are adapted to fold back in response to aerodynamic force occurring outside of said guh barrel.

8. A projectile according to claim 1 wherein said load comprises a plurality of subloads.

9. A projectile according to claim 8 wherein said subloads comprise flechettes.

10. A projectile according to claim 1 wherein said bearing sleeve comprises a polymeric material.

11. A projectile according to claim 10 wherein the journal sleeve is made of the same material as said bearing sleeve.

12. A projectile for firing in a gun barrel, comprising:

a bearing sleeve having a predetermined axial length;

a journal sleeve of about said predetermined axial length mounted in said bearing sleeve to axially rotate therein; and a load of about said predetermined axial length mounted in said journal sleeve to rotate therewith, whereby the angular rotation of said load with respect to said gun barrel is reduced.

* * * * *